(12) United States Patent
Kolodizner et al.

(10) Patent No.: US 10,469,658 B2
(45) Date of Patent: Nov. 5, 2019

(54) SYSTEM AND METHOD FOR DYNAMIC REDUNDANT CALL RECORDING

(71) Applicant: Nice Ltd., Ra'anana (IL)

(72) Inventors: Efim Kolodizner, Ashdod (IL); Aviv Sevillia, Sde Itzhak (IL); Uri Frieder, Jerusalem (IL)

(73) Assignee: NICE Ltd., Ra'anana (IL)

( * ) Notice: Subject to any disclaimer, the term of this patent is extended or adjusted under 35 U.S.C. 154(b) by 0 days.

(21) Appl. No.: 16/222,314

(22) Filed: Dec. 17, 2018

(65) Prior Publication Data

US 2019/0124200 A1 Apr. 25, 2019

Related U.S. Application Data

(63) Continuation of application No. 15/242,772, filed on Aug. 22, 2016, now Pat. No. 10,182,146.

(51) Int. Cl.
*H04M 3/42* (2006.01)
*H04M 3/51* (2006.01)
(Continued)

(52) U.S. Cl.
CPC ..... *H04M 3/42221* (2013.01); *H04M 3/2218* (2013.01); *H04M 3/5175* (2013.01); *H04M 3/5183* (2013.01); *H04M 3/523* (2013.01)

(58) Field of Classification Search
CPC ....... G10L 25/84; H04M 3/22; H04M 3/2218; H04M 3/42; H04M 3/42221; H04M 3/51; H04M 3/5175; H04M 3/5183; H04M 3/523; H04M 1/24; G06F 15/16
USPC ............... 370/259, 220, 237, 241, 351, 352; 379/1.02, 9.05, 32.01, 85, 88.01, 88.04, 379/88.08, 88.17, 88.18, 88.19, 88.22, 379/88.23, 265.11, 35, 49, 70, 202.01, 379/207.02, 266.1; 386/241; 455/414.1,
(Continued)

(56) References Cited

U.S. PATENT DOCUMENTS 5,937,029 A * 8/1999 Yosef ................. H04B 1/74
370/217
6,102,970 A * 8/2000 Kneipp ............... G06Q 30/02
379/219
(Continued)

FOREIGN PATENT DOCUMENTS

WO WO 2015/127813 9/2015

*Primary Examiner* — Gerald Gauthier
(74) *Attorney, Agent, or Firm* — Pearl Cohen Zedek Latzer Baratz LLP

(57) ABSTRACT

A system or method for dynamic redundant call recording may include a plurality of recording devices, each recording device having a plurality of recording resources, and a resource allocator. The resource allocator may receive a request from a call receiving node for commencement of a recording session. It may then attempt to connect to a first one of the plurality of recording devices and if successful, establish a recording session between the call receiving node and the recording device, or if not successful, attempting to connect the recording session controller to a second one of the multiple recording devices. Two resource allocators may operate in parallel to establish dual recording using resources at two different recording devices. Call content may be recorded separately from call metadata and may be integrated with the metadata using a unique call ID.

13 Claims, 10 Drawing Sheets

(51) Int. Cl.
*H04M 3/22* (2006.01)
*H04M 3/523* (2006.01)

(58) Field of Classification Search
USPC ......... 455/406, 412.1, 422.1; 707/740, 706; 709/224, 227; 717/155
See application file for complete search history.

(56) References Cited

U.S. PATENT DOCUMENTS

| | | | | |
|---|---|---|---|---|
| 6,249,570 B1* | 6/2001 | Glowny | ................ | G11B 31/00 379/111 |
| 6,252,947 B1* | 6/2001 | Diamond | ............... | G11B 31/00 379/88.09 |
| 6,504,907 B1* | 1/2003 | Farris | ...................... | H04L 43/00 379/126 |
| 6,870,920 B2* | 3/2005 | Henits | ............... | H04M 3/42221 360/39 |
| 6,937,706 B2* | 8/2005 | Bscheider | ............... | G11B 31/00 379/111 |
| 7,023,979 B1* | 4/2006 | Wu | ..................... | H04M 3/5233 379/265.11 |
| 8,150,007 B2 | 4/2012 | Didcock | | |
| 8,199,886 B2* | 6/2012 | Calahan | ................ | H04M 7/006 370/352 |
| 8,320,536 B2* | 11/2012 | Portman | ........... | H04M 3/42221 370/241 |
| 8,477,915 B1* | 7/2013 | Vasquez | ............ | H04M 3/42221 370/260 |
| 8,553,851 B2* | 10/2013 | Weir | ....................... | H04L 12/66 379/112.01 |
| 8,644,457 B1* | 2/2014 | Vasquez | .............. | H04M 3/4217 379/266.1 |
| 9,179,000 B2 | 11/2015 | Kolodizner et al. | | |
| 9,369,570 B1* | 6/2016 | Kolodizner | ......... | H04M 3/2236 |
| 9,374,315 B2* | 6/2016 | Zur | ........................... | G06F 9/52 |
| 2001/0055372 A1* | 12/2001 | Glowny | ................. | H04M 3/36 379/88.22 |
| 2003/0123436 A1* | 7/2003 | Joseph | ................. | H04L 12/2856 370/352 |
| 2006/0092926 A1* | 5/2006 | Tang | ................... | H04L 12/2856 370/352 |
| 2006/0146783 A1* | 7/2006 | Yurchenko | .......... | H04L 12/2856 370/351 |
| 2006/0146784 A1* | 7/2006 | Karpov | ................ | H04L 12/2856 370/351 |
| 2008/0082669 A1* | 4/2008 | Williams | .......... | H04M 3/42221 709/227 |
| 2008/0260116 A1* | 10/2008 | Didcock | ................ | H04M 3/241 379/88.18 |
| 2009/0010168 A1* | 1/2009 | Yurchenko | ............. | H04L 12/66 370/237 |
| 2009/0034436 A1* | 2/2009 | Brodhagen | ........ | H04M 3/42221 370/259 |
| 2009/0129374 A1* | 5/2009 | Yurchenko | ........... | H04L 12/2856 370/352 |
| 2009/0290687 A1* | 11/2009 | Williams | .......... | H04M 3/42221 379/32.01 |
| 2010/0034362 A1* | 2/2010 | Phelps | .............. | H04M 3/42221 379/88.19 |
| 2010/0316199 A1* | 12/2010 | Martin, II | ......... | H04M 3/42221 379/88.08 |
| 2012/0088471 A1* | 4/2012 | Kong | ..................... | H04L 12/14 455/406 |
| 2013/0080413 A1* | 3/2013 | Chen | ..................... | G06F 16/278 707/706 |
| 2013/0084053 A1* | 4/2013 | Ackermann | ..... | H04N 21/23424 386/241 |
| 2013/0148794 A1* | 6/2013 | Phelps | ................ | H04M 3/5175 379/88.04 |
| 2014/0173096 A1* | 6/2014 | Rao | ................... | H04M 3/42221 709/224 |
| 2014/0270093 A1* | 9/2014 | Lum | ................... | H04L 65/1006 379/1.02 |
| 2014/0270118 A1* | 9/2014 | Kolodizner | ............. | H04M 3/53 379/88.17 |
| 2014/0351256 A1* | 11/2014 | Gluck | ............... | H04M 3/42221 707/740 |
| 2015/0133092 A1* | 5/2015 | Shaffer | ............. | H04M 3/42221 455/414.1 |
| 2015/0189078 A1* | 7/2015 | Sittin | ................ | H04M 3/42221 379/85 |
| 2016/0227029 A1* | 8/2016 | Wolfeld | ............ | H04M 3/42221 |
| 2016/0232923 A1* | 8/2016 | Lassche | .................. | G10L 25/84 |
| 2017/0064075 A1* | 3/2017 | Chatterjee | ......... | H04M 3/42221 |
| 2017/0310823 A1* | 10/2017 | N | ....................... | H04M 3/42068 |
| 2017/0339271 A1* | 11/2017 | Kolodizner | ......... | H04M 3/2236 |
| 2018/0054518 A1* | 2/2018 | Kolodizner | ......... | H04M 3/2218 |

* cited by examiner

SYSTEM AND METHOD FOR DYNAMIC REDUNDANT CALL RECORDING

PRIOR APPLICATION DATA

The present application is a continuation of prior U.S. application Ser. No. 15/242,772, filed Aug. 22, 2016, entitled "SYSTEM AND METHOD FOR DYNAMIC REDUNDANT CALL RECORDING", incorporated herein by reference in its entirety.

FIELD OF THE INVENTION

The present disclosure relates to the recording of information, and in particular to methods and systems for recording information in which redundancy is provided to mitigate against the effects of a recording failure.

BACKGROUND

In real time recording of information, if a recording component fails it may be possible to reestablish recording using another recording component. However information may be lost in the time period between the failure of one component and the commencement of recording with another component. To mitigate against such loss of information it is known to provide redundancy, or duplication, in which two or more recording resources are used to make multiple recordings of the information. Then if one of the recording resources fails there is no loss of recorded information since the other resource should have recorded the information. The term "redundant" is used since if there is no failure in recording some of the recorded information may be redundant in that it has been duplicated.

SUMMARY

Some embodiments of the present invention address some problems that arise with the use of known recording systems.

Some embodiments of the invention provide systems and method for dynamic call recording.

Some embodiments of the invention provide a method of allocating recording resources in a system for recording of call content such as audio and/or video, for example in real time. The method according to some embodiments may include a plurality of recording devices, each recording device having a plurality of recording resources, and at least two resource allocators. Two resource allocators may operate in parallel and independently of each other to receive a request from a call receiving node in the system for commencement of a recording session. In response to the request, each resource allocator may query the availability of respective different ones of the plurality of recording devices to identify an available recording device. For example the resource allocators may independently of each other attempt to connect to different ones of the plurality of recording devices. If a first attempt is successful, e.g. a recording device is available, a resource allocator may establish a recording session between the call receiving node and the recording device. If the attempt is not successful, e.g. a recording device is not available, the resource allocator may attempt to connect to another one of the multiple recording devices. The resource allocators may report to the call receiving node the identity of an available resource at the recording device to enable direct communication between the recording device and the call receiving node for streaming the content. The resource allocators may be mapped to different respective sets of recording devices to avoid the possibility of the same recording device receiving different requests to record the same information.

Thus, after allocation of resources, a resource allocator may be bypassed in subsequent communication between the call receiving node and the recording device.

According to some embodiments of the invention, recording resources may be allocated to recording sessions at the start of each session according to availability. One possible effect of this is that the same recording resources are not necessarily always paired. Thus the pairing of resources in order to provide redundancy may be dynamic rather than predetermined.

In some possible applications for the invention, it may be a requirement for recorded content to be correlated with other data related to a call. "Correlate" in this context may mean for example finding two or more items of different kinds answering the same criterion, for example being associated with the same identifier. The result of correlation may be a link made between items that are correlated. For example, if the information is audio from a voice call between parties, it may be desirable to correlate it with other data related to the call, such as metadata, for example relating to the call or the caller, that has been processed separately. The correlation may enable a query, for example to a database, using metadata such as phone number or agent identity, to retrieve and playback a linked recording. The dynamic allocation of recording resources may introduce new challenges in terms of correlating recorded information with related data and some embodiments of the invention provide systems and methods which address these challenges.

The term "metadata" is used herein unless otherwise stated to refer to data that describes other data. For example caller ID is metadata that describes a call in terms of who the caller is. Thus a complete record of a call may comprise the content plus call metadata.

Some embodiments of the invention provide a system for handling calls made to and from a contact center, each call comprising call content. The system may comprise a gateway configured to forward or direct calls to be routed between callers and contact center agents; a recording system configured to record call content in real time and to create metadata for each recording; and a recording controller. The gateway may operate to attach or associate a unique call identification (ID) to the call and to direct the call content with the unique call ID to the recording system. The recording controller may be configured to receive recording metadata from the recording system with the unique ID, and to correlate recording metadata with call metadata using the unique call ID.

According to some embodiments of the invention content being recorded may be made available in real time at the same time as dual or redundant recording is taking place.

Some embodiments of the invention provide a system for redundant call recording comprising a call receiving node, a recording system comprising at least two recording devices, and a recording controller; wherein the recording system is configured to establish independent and separate recording of call content using two of said recording devices; and the recording controller is configured to link call content with call metadata to enable retrieval of call content during recording.

Embodiments of the invention may be used in any situation where real time recording of information, such as call content, is required. The information may be of any kind including but not limited to audio and video.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features and advantages thereof, may be understood by reference to the following detailed description when read with the accompanied drawings. Embodiments of the invention are illustrated by way of example and not limitation in the figures of the accompanying drawings, in which like reference numerals indicate corresponding elements, and in which:

DETAILED DESCRIPTION

Figure 1:
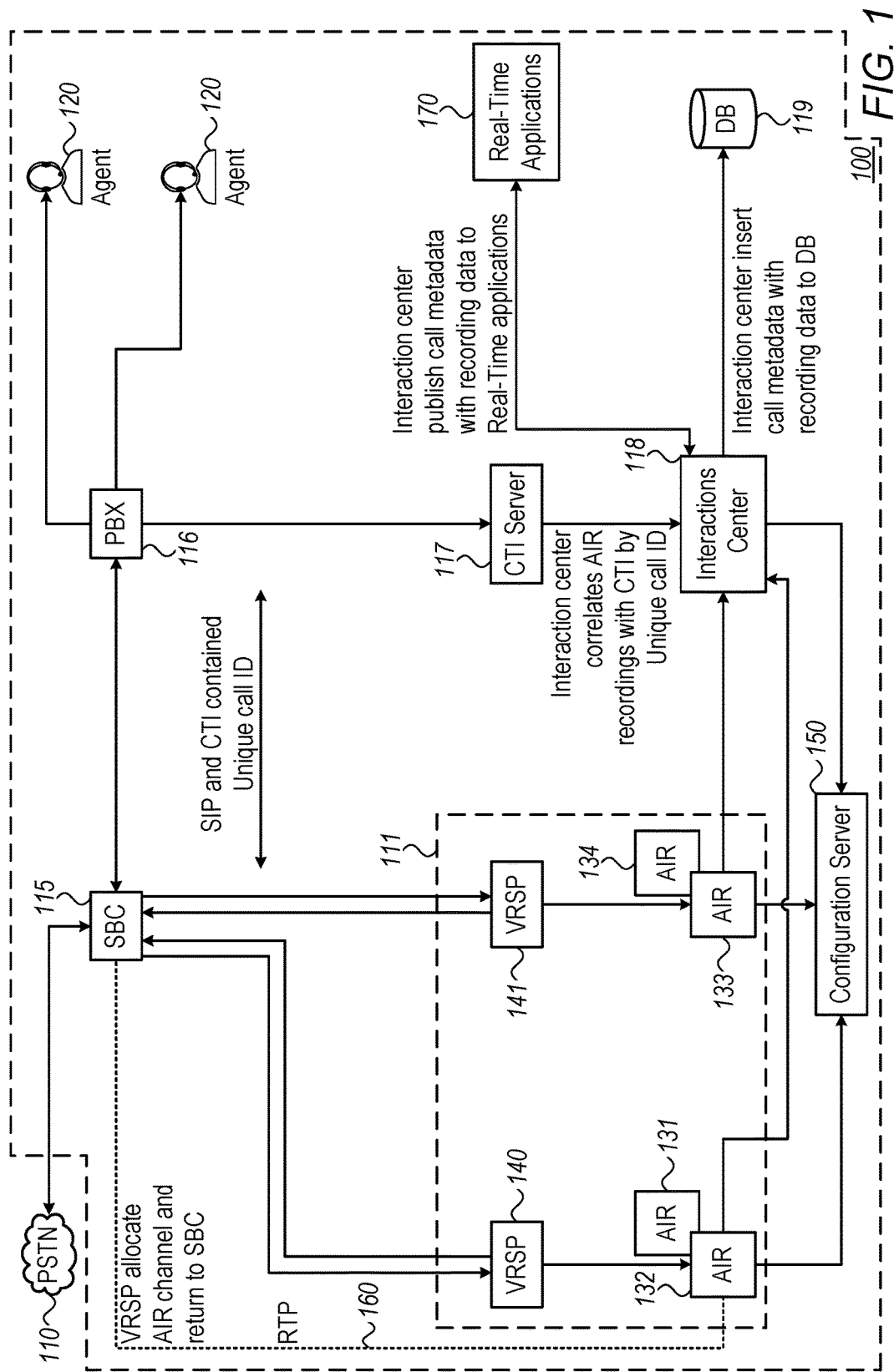
FIG. 1 is a high-level schematic diagram of a system for recording of call content according to some embodiments of the invention.

In the following description, various aspects of the present invention will be described. For purposes of explanation, specific configurations and details are set forth in order to provide a thorough understanding of the present invention. However, it will also be apparent to one skilled in the art that the present invention may be practiced without the specific details presented herein. Furthermore, well known features may be omitted or simplified in order not to obscure the present invention.

Unless specifically stated otherwise, as apparent from the following discussions, it is appreciated that throughout the specification discussions utilizing terms such as "processing," "computing," "calculating," "determining," or the like, refer to the action and/or processes of a computer or computing system, or similar electronic computing device, that manipulates and/or transforms data represented as physical, such as electronic, quantities within the computing system's registers and/or memories into other data similarly represented as physical quantities within the computing system's memories, registers or other such information storage, transmission or display devices.

A "call" or "telephone call" as used herein, also generally known as an "interaction", may be any communication, for example, between a caller and one or more agents (e.g., human agents at a call center, or possibly automated agents), over a communication network. The routing of a call may be controlled by a call switch or call exchange such as a Private Branch Exchange "PBX" and may also be referred to as an "communication session". A "call" is usually a voice call or telephone call, e.g. voice over internet protocol "VoIP", but for the purpose of this description a call may also be a video call for example. It should be noted also that a "call" may be a one-way interaction where there is a one-way "conversation" or flow of real-time transport protocol "RTP" packets from a user endpoint e.g. to a recording system or device, or a "call" may be a two-way (bi-directional) or multi-path interaction between two or more parties where there is a multi-path "conversation" or flow of RTP packets from each of the multiple user endpoints to the recording system.

Some embodiments of the invention are described herein with reference to an example of recording a call made to or from a contact center. One party to such a call may be a contact center agent. The term "caller" is used herein to refer to the other party to such a call. It will be appreciated that the caller is not necessarily the party who initiated the call.

A contact center may handle all kinds of calls and is not limited to audio calls.

The expression "call metadata" is used herein unless otherwise stated to refer to any information that it may be useful to associate with or link to a call. This may include details of the call itself such as but not limited to start time, end time, reason for start or stop, call duration, call reason, information relating to the calling parties such as phone numbers, and other information less directly related to the call such as but not limited to one or more businesses with which a calling party is associated. Such information may be useful for example in enabling searches of recorded calls.

Metadata used in methods and systems according to some embodiments of the invention may include recording metadata. Recording metadata may describe content that has been or is being recorded. Examples of recording metadata include but are not limited to identity of recording device and/or recording resource, Start/Stop record time, direction (for example who is speaking, e.g. customer or agent), used compression scheme, file name where the recording is saved, and UCID. Some recording metadata may be created by a recording device and may be reported for example to a recording controller.

It should be noted that an interaction or call may include more than one recording and therefore the same unique call ID or interaction ID may be allocated to more than one recording. Recording metadata may for example be referenced by interaction metadata to enable all recordings comprised in the same call or interaction to be retrieved.

The expression "real time" as used herein is refers to systems in which operations are performed in a very short time so that from the point of view of a human user the results are available virtually immediately.

The term "user" is used herein to refer to a party on whose behalf calls are recorded. Thus for example in the context of a call center the user may be a business customer of the contact center. A contact center may serve several users, for example by having different agents allocated to different users.

Some of the embodiments of the invention described herein are designed for recording audio content from audio calls. The general principles of these embodiments are applicable to any system for recording information where redundancy is required in order to mitigate loss of data as a result of a failure of part of the system. Therefore some embodiments of the invention provide methods and systems for recording any kinds of data.

In order for multiple calls to be recorded simultaneously, calls may be allocated to recording channels, also known as recording resources. Allocation of recording resources may be achieved by a dedicated resource manager or resource allocator.

Some embodiments of the invention operate according to session initiation protocol "SIP". Active SIP recording may require notification to an interactions center or similar system component on completion of a recording session to be matched to interaction metadata. In some prior art SIP recording systems each recording component may be in a critical path, meaning for example that if the path is broken this matching may not be possible.

In some known call recording systems, upon failure of a recording device it is necessary for a controller to be notified and updated with a new address of an available recording device, which may cause recordings to be lost until a new available recording device takes over all recording sessions.

In order for recordings to be correlated with other information relating to a call, some known systems require a recording controller always to be available so that there is no separation between recording controller and recording device until a recording session is complete.

Systems which use redundancy to mitigate against recording resource failure may require either synchronization between resource managers, also called resource allocators, or strong coupling between the two recording resources in order to ensure that the same recording resources are always paired. This has a number of disadvantages, one being that if one of the recording resources fails the same pair is not available for a future recording session and both resources are in effect unavailable until the recording system is reconfigured.

FIG. 1 is a high level diagram of a system for recording call content such as audio information according to some embodiments of the invention, in a contact center environment. Other embodiments may be used in other environments. The invention is not restricted to recording information in contact centers and embodiments of the invention may be used in any application where recording of information with redundancy is required. In the system of FIG. 1, a contact center environment 100 may be coupled to a network 110 such as a packet switched telephone network "PSTN" or any other network capable of transmitting telephone calls or other communications to the contact center environment 100. The contact center may include a session border controller "SBC"115 serving as a gateway to and from the contact center. The functions performed by the session border controller described herein need not be carried out at a gateway and may be performed at any call receiving node in the system. Components of the contact center may operate according to Session Initiation Protocol "SIP".

The SBC 115 may function to route calls to a call switch or PBX 116 within the contact center environment 100. The call switch or PBX may function to receive incoming calls via the gateway and to route calls between callers and contact center agents 120. Each call may include content, for example audio information, and call metadata. The SBC 115 may separate the audio information from some or all of the metadata related to or contained in the call and direct the audio information to a recording system 111 to be recorded. Metadata related to a call that may be separated from audio information by the SBC 115 may include any one or more of call start time customer telephone number and agent phone number for example. Thus the SBC 115 may act to initiate a recording session. The recording of the audio information may be passive. For example according to some embodiments of the invention, neither the caller nor the contact center agent devices need to perform any action to initiate recording. The SBC 115 or another system component performing a similar function may simply "tap" the communication line. This is also referred to as sniffing. It follows therefore that the component doing the sniffing may not be aware of the identity of either party to the call. In particular the SBC 115 may not be aware of the identity of the contact center agent, or for calls from the agent the SBC 115 may not know the identity of the caller (the other party to the call). Therefore according to some embodiments of the invention, when a call is initiated a unique call ID "UCID" is allocated to it or attached to it, for example by the gateway or SBC 115. The UCID is attached to or associated with the audio information which is routed to the recording system 111 and the PBX 116. The UCID may be used to correlate the audio information that has been or is being recorded with other data relating to the call such as call metadata and/or interaction metadata. The SBC 115 may separate the call content from metadata forming part of the call and forward to the recording system 111 only the minimum amount of information relating to the call. In other words, not all of the call metadata, other than content is passed to the recording system 111. However this metadata may be passed to the PBX 116 and the contact center agent 120 and it may be desirable to correlate this data to recorded content from the call. To "forward" the call content may mean for example routing or directing or passing or transmitting it to another component in the system, for example the recording system, without performing any processing on it. The forwarding may use wireless or wired communication or any other method of forwarding may be used.

When used herein "unique" may mean unique within a certain closed system (e.g., according to some embodiments of the present invention, ID numbers assigned by a system or service). "Unique" IDs or numbers may be not absolutely unique in the sense that they may be reproduced outside of the domain or system in which they are intended to be used: e.g., a US telephone number may be the same as a customer ID number for a certain private company, yet both numbers are "unique" in their domain. In the context of some embodiments of the present invention, a telephone number is not unique to a call and may not be unique to a caller, and for this reason a unique identifier may be allocated to each call.

In the embodiment of FIG. 1, the recording system 111 includes recording devices called active interaction recorders or "AIRs" 131, 132, 133, and 134 and one or more resource allocators 140, 141. Each recording device may include a plurality of recording resources. Other embodiments of the invention may include other kinds of recording device and unless otherwise stated an AIR as mentioned herein may be any kind of recording device. Each AIR 131-134 communicates with the SBC 115 via a resource allocator called a voice recording SIP proxy "VRSP". Other kinds of resource allocator or resource manager may be used instead of VRSPs according to some embodiments of the invention and unless otherwise stated a VRSP as mentioned herein may be any kind of resource allocator. FIG. 1 shows two AIRs connected to each of two VRSPs 140, 141. The recording system 111 may include any number of resource allocators and any number of recording devices may be allocated to each resource allocator.

Figure 2:
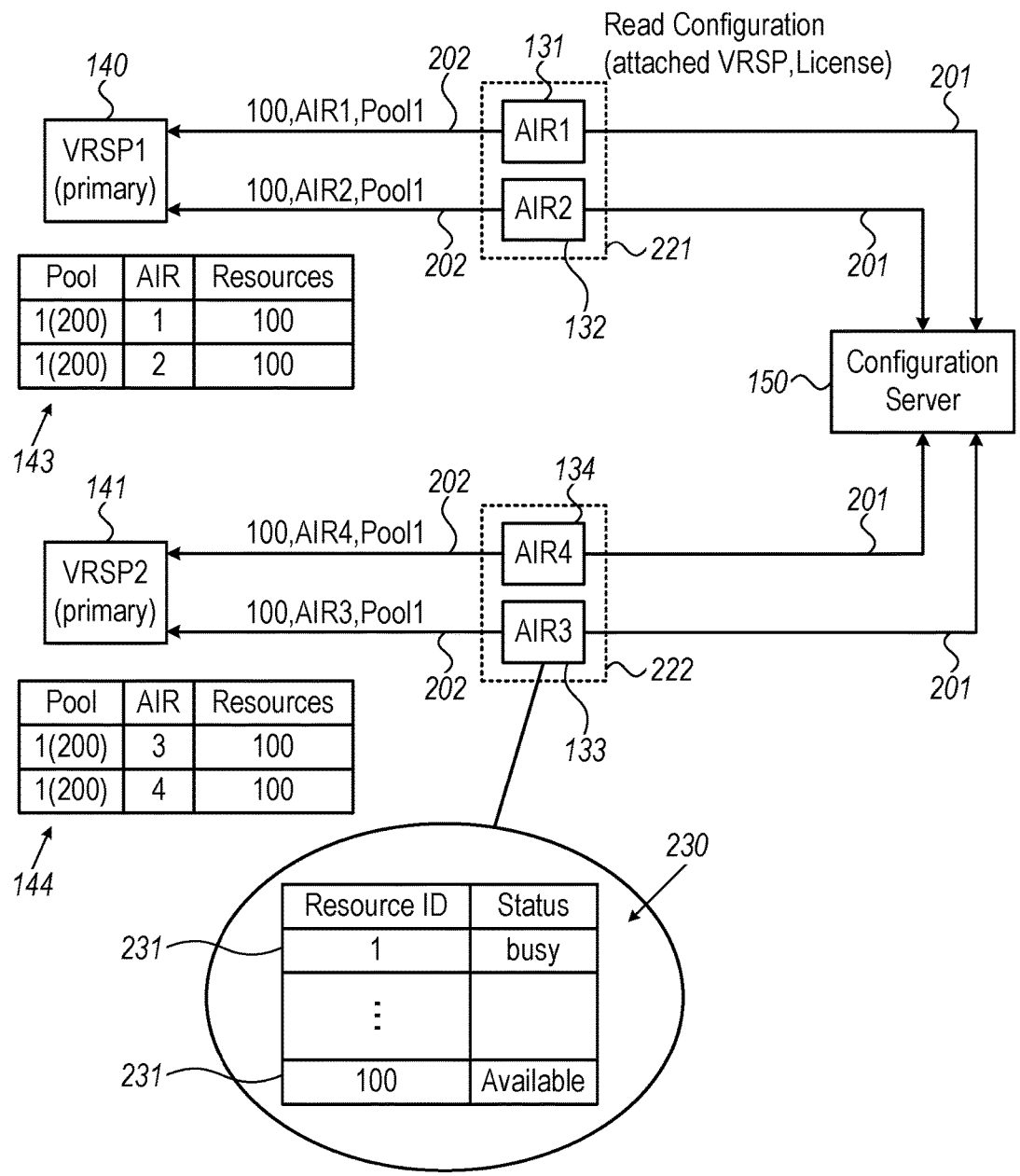
FIG. 2 illustrates a messaging flow between resource allocators, recording devices and a configuration server according to some embodiments of the invention.
Figure 3:
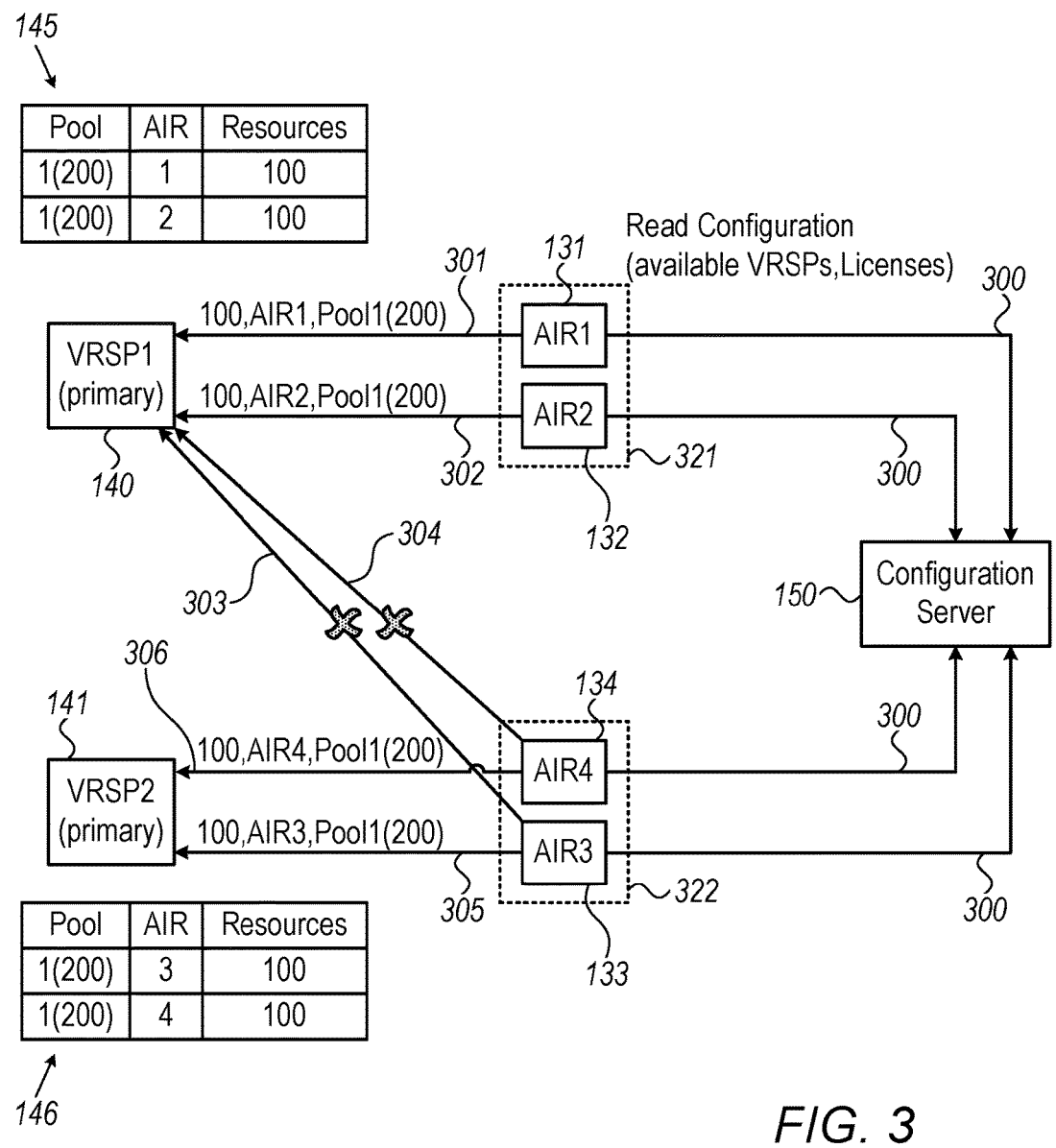
FIG. 3 illustrates an alternative messaging flow between resource allocators, recording devices and a configuration server according to some embodiments of the invention.

The allocation, or mapping, of recording devices to resource allocators may be performed with the aid of a configuration server 150 described further with reference to FIGS. 2 and 3.

The audio content of calls is routed to the recording system 111, e.g. routed to VRSPs 140, 141 from the SBC, with the UCID allocated to each call.

The call center environment 100 may further include a computer telephony integration "CTI" sever 117. The PBX 116 may pass or forward or route data relating to the call to the CTI server including the call ID and other information such as but not limited to caller's telephone number, call metadata such as call start time and end time, call duration, or other information such as may have been captured by a contact center agent during the call, for example relating to the call or caller. The data passed from the PBX may not include the call content, e.g. audio information. CTI server 117 may perform various functions including, but not limited to, storing caller information, possibly including information relating to the caller's business, and matching incoming calls to caller information based on information received from the PBX 116.

The call center environment may further include an interactions center 118. Interactions center 118 may perform various functions including but not limited to correlating recordings by the AIRs 131-134 with other information relating to the caller. This correlation may be done using the caller ID allocated by the SBC 115, described with reference to FIG. 7. The interactions center includes a recording controller and associated driver described in more detail with reference to FIG. 6. In general, a recording controller for example at the interactions center may be configured to receive recorded content of a call from a recording device. The recording controller may separately receive call metadata, e.g. from the call switch or PBX 116 optionally via the CTI server 117. Alternatively the recording controller may create call metadata based on information received from the PBX 116 and/or the CTI server 117. The integration of content and metadata or correlation of content and other data relating to the call may be performed using the unique call identity associated with or attached to the content and the metadata.

The system of FIG. 1 may further comprise a real time applications (RT) server 170. Examples of real time applications that may be supported by RT server 170 include but are not limited to monitoring applications, for example for monitoring interaction, e.g. conversation status; RT playback applications for example to enable a supervisor to stream the content of ongoing calls to hear the conversation in RT, update interaction details in RT, for example, if a customer buys something; and RT authentication e.g. for authenticating a calling customer in RT based on a voice print sample.

The call center environment may also include one or more databases, one of which is indicated as 119, which may store details of calls. For example, database 119 may store information enabling the retrieval of audio recordings of calls from a particular caller or group of callers, based on information provided to it by the interactions center 118. Database 119 may store the audio information. Alternatively the audio information may be stored at the AIRs in which case the database may simply store the identity of the AIR for each recorded call. According to some embodiments of the invention recording metadata and/or call metadata may be reported to database 119 and may be used for example in the retrieval and management of recording files.

It should be noted that the components of the call center environment may be geographically separated from each other and may communicate with each other in various different ways. They may use different communication networks using different technologies including but not limited to any of wired and wireless, internet, intranet, local area networks, wide area networks, WiFi and cellular. Different components may use different communication networks or technologies. For example, different VRSPs may communicate with the SBC via different communication networks. Furthermore any of the components may take any forms such as physical (hardware) or virtual (software) or a combination of hardware and software.

It should also be noted that the components of the call center environment are shown separately for the purpose of explanation, but any of the components may be combined and the functions of any of the components may be distributed rather than being performed in a single device.

Figure 11:
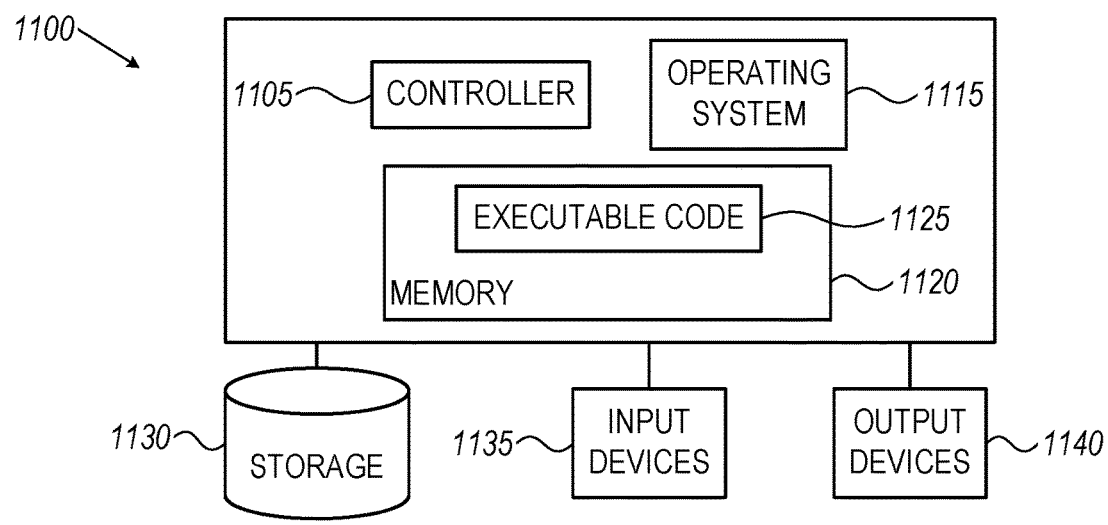
FIG. 11 is a high level block diagram of an exemplary computing device according to embodiments of the present invention.

Any of components of the system of FIG. 1, including any of the gateway or SB 115, the switch or PBX 116, the resource allocators or VRSPs 140, 141, the information server 117 and the recording controller at the interactions center 118, may include a computing device. As such they may include any of a controller such as a central processing unit processor, an operating system, a memory and/or other storage, input devices and output devices. One or more processors in any of the components may be configured to perform operations of methods according to some embodiments of the invention, for example by execution of one or more algorithms. Various components such as gateway or SBC 115, switch or PBX 116, resource allocators or VRSPs 140, 141, the information server 117 and recording controller at the interactions center 118 may include components such as shown in FIG. 11, and may be configured to carry out embodiments of the invention by for example executing (or having a processor execute) code or software, and/or by including dedicated code.

Each AIR 131-134 may include multiple recording resources whereby, for example, one AIR may record multiple calls simultaneously with each call occupying a different resource. Thus each resource may be equivalent to a recording channel. Some embodiments of the invention provide innovative methods and systems for allocating resources to calls. According to some embodiments of the invention, instead of the allocation being predetermined, the allocation of recording resource may be done at the start of each call or communication session according to resource availability.

System Configuration

Prior to the allocation of calls to recording resources, a system according to some embodiments of the invention may be configured, for example by mapping AIRs or AIR resources to VRSPs so that the AIRs or AIR resources may then be connected to the VRSPs to which they are mapped. In some embodiments the result of this mapping is that each recording resource is mapped to one resource allocator. A VRSP may then allocate calls to AIR resources which have been mapped to it. This mapping of recording resources to resource allocator may be done in several ways. Two examples are shown in FIGS. 2 & 3. Other methods of mapping may be used according to some embodiments of the invention.

Each AIR may include multiple recording resources. A resource may be in the form of a logical entity, for example an object allocated in a memory, e.g. temporary memory, of a computing system forming an AIR. This is illustrated in FIG. 2 by way of example for AIR 133 where resources are each represented as a line 231 in a table 230 with status "busy" or "available". Each of the recording devices shown in all of the figures may include multiple resources allocated in this way or in any other way whereby simultaneous recording of information may be achieved.

A call center user may purchase a number of licenses to use the recording system 111 and this may determine the number of calls that may be recorded, or dual-recorded to provide redundancy, simultaneously for that user. The number of licenses determines the number of channels, or resources, that need to be available simultaneously for that user. In one possible system the user may elect how recording devices, e.g. AIRs are distributed between resource allocators such as VRSPs in order to provide this redundancy.

A system according to some embodiments of the invention, in which a user may have allocated AIRs to VRSPs in advance is illustrated in FIG. 2. In this system the the recording devices may be configured to create or establish the mapping by receiving configuration data including the identity of a resource allocator, establishing a connection with the identified resource allocator, and transmitting to the resource allocator information relating to the recording device such as number of available recording resources and address or port to which information should be sent for recording.

The allocation of AIRs to VRSPs, may be done by the user via a configuration server 150. In this way the user may choose how redundancy is provided. The user may have preferences based on factors including but not limited to the network via which an AIR communicates with the SBC, or the fact that it is physical or virtual. For example, a user may designate AIRs to each of two or more VRSPs. FIG. 2 shows that on initial set up of a recording system 111 according to some embodiments of the invention, each AIR 131-134 may query a configuration server 150 from where it may read configuration data for that AIR. The configuration data may be in a configuration file, or may comprise a record in a database, or may be otherwise available to be consulted or requested by an AIR. The configuration data may include the identity of a resource allocator, e.g. the VRSP to which it should be mapped, and the number of resources allocated to it, for example the number of simultaneous channels that it is to provide for the user. FIG. 2 shows an example in which AIR 131 and AIR 132 in group 221 are to be connected to VRSP 140 and AIRs 133 and 134 in group 222 are to be connected to VRSP 141. Thus, for example, after AIR 131 has received or read its configuration file at the configuration server 150, AIR 131 may connect to VRSP 140 and may provide, e.g. transmit, information relating to AIR 131 to VRSP 140. This information may include for example number of available recording resources, e.g. channels, and internet protocol "IP" address and/or port to which information should be sent for recordal, for example packets streamed or provided according to real time protocol "RTP". The tables shown next to each VRSP indicate that the user has a pool of 200 resources, e.g. 200 available simultaneous recording channels. Each of AIRs 131 and 132 provide 100 channels and redundancy for these 200 channels is provided by AIRs 133 and 134.

Configuration information input by a user may include for example (other information may be included):
VRSP Address, Attached AIR, Number of Allocated resources (Licenses), Allocation Data. The information may take the following form:

TABLE 1

| Allocation Data for User-Allocated Pool | |
| --- | --- |
| VRSP_ID | String |
| AIR_ID | Integer |
| Resource Number | Integer |

A VRSP may create an allocation table, for example in the following form (other formats may be used):

TABLE 2

| VRSP Allocation table | |
| --- | --- |
| AIR ID | Integer |
| Destination IP address | String |
| Destination Port | Integer |
| Busy | BOOL |

Thus for example the destination IP address is the one to which the SBC will send RTP packets.

A possible series of operations on initial configuration of a system may include:
1. Each AIR 131-134 calls Configuration Server 150 as indicated by arrows 201 according to AIR ID (AllocationData.AIR_ID=1) and gets or receives a dedicated VRSP address (AllocationData.VRSP_ID="1.1.1.2"), and number of resources allocated for it e.g. in the example of FIG. 2 (AllocationData.Resource_Number=100).
2. AIR allocates internally all needed resources (e.g. ports, e.g. one for each channel).
3. AIR connects to a VRSP as indicated by arrows 202 and passes to the VRSP information such as AIR ID (AllocationData.AIR_ID), number of allocated resources (AllocationData.Resource_Number=100), destination IP address, destination Port, thus the VRSP can build the allocation table.
4. VRSP builds the allocation table with destination AIR ID (AllocationTable.AIR_ID =1), IP (AllocationTable.IP="1.1.1.1") and Port (AllocationTable.Port=2000) and a flag indication that a resource is free (AllocationTable.Busy=False).

At the end each VRSP has the whole picture of available resources.

Systems according to some embodiments of the invention may be configured in a different manner in which, instead of the user specifying the allocation of AIRs to VRSPs, the AIRs may form a self-organized pool of recording devices. In such a system a user may define only the number of channels (licenses or resources) for the system and, optionally, VRSP addresses which may be known to the user to be available. A system in which a user has not pre-selected which AIR is to communicate with which VRSP is illustrated in FIG. 3. In this system the recording devices may be configured to create or establish the mapping by receiving configuration data including the identity of multiple resource allocators and querying one or more of the multiple resource allocators in succession to create or establish a mapping for each resource according to the availability of the resource allocator. In this way pairing of recording devices, for example to provide redundancy, need not be predetermined In the embodiment of the embodiment shown in FIG. 3, on initial set-up a new mapping may be created between AIRs and VRSPs. The VRSPs may be organized in a list. Broadly, the mapping may take place by each recording device or AIR attempting to connect to a resource allocator or VRSP in the list, and registering with the VRSP all the channels available to the user from that AIR. Once a VRSP has no more capacity, for example because the number of AIR resources allocated to it is equal to the number of (dual) resources allocated to the user, it refuses all recording device calls. Thus another AIR attempting to map resources to the same VRSP will be rejected and may attempt to connect to another VRSP. VRSPs may be chosen by the AIRs from the list randomly or according to a particular order. More specifically:

Configuration data obtained by each AIR from a configuration server 150 may include for example (other data may be used): Available VRSPs address, attached AIR, total number of allocated resources (Licenses). As with the example of FIG. 2 the allocation data may take the form of table 3 (other formats may be used).

TABLE 3

Allocation data for self-organized pool

| VRSP_ID [ ] | Array or String |
| AIR_ID | Integer |
| Total_Resource_Number | Integer |
| AIR_Resource_Number | Integer |

It should be noted by comparison with table 1 that table 3 includes an additional field which indicates a Total Resource Number which the total number of resources which the VRSP can provide which the VRSP refers to when receiving a new request from an AIR. A VRSP may create an allocation table, for example in the same form as table 2.

A possible series of operations on initial configuration of a system may include:
1. Each AIR 131-134 calls Configuration Server 150 according to AIR ID (AllocationData.AIR_ID=1) and gets all available VRSP addresses (AllocationData.VRSP_ID [ ]="1.1.1.2", "1.1.1.2"), Total and number of resource allocated for it (AllocationData.Total_Resource_Number=200) and Allocated resources for this specific AIR (AllocationData. AIR_Resource_Number=100).
2. AIR allocates internally all needed resources (ports), connects to a VRSP, e.g the first in a list (AllocationData.VRSP_ID [0]) and passes, e.g. transmits, information to the VRSP including e.g. AIR ID (AllocationData.AIR_ID), number of allocated resources (AllocationData.Resource_Number=100), destination IP address, destination Port, thus the VRSP can build the allocation table.
3. VRSP builds Allocation Table with destination AIR ID (AllocationTable.AIR_ID=1), IP (AllocationTable.IP="1.1.1.1") and Port (AllocationTable.Port=2000) and a flag indication that a resource is free (AllocationTable.Busy=False).
4. The VRSP summarizes number of allocated channels and makes sure it does not exceed Total Allocated number (Allocation Data. Total_Resource_Number). If it does exceed, the call is rejected and AIR goes to the next VRSP in the list (AllocationData.VRSP_ID[1]).

Referring again to FIG. 3, a possible messaging flow between AIRs and VRSPs is described in more detail. Initially the AIRs obtain their configuration files from the configuration server in a similar manner to that described with reference to FIG. 2, indicated by arrows 300.

Arrow 301 indicates AIR 131 attempting to connect to VRSP 140. The connection is successful and the VRSP 140 completes the first row in its allocation table 145 stating the number of pools (1), the number of (duplicated) resources in the pool (200) equivalent to the number of licenses allocated to the user, the AIR_ID (1) and the number of resources associated with that particular AIR (100).

Arrow 302 indicates AIR 132 similarly successfully connecting to VRSP 140, following which the second row in VRSP allocation table 145 is completed.

Arrow 303 indicates AIR 133 attempting to connect to VRSP 140. In this case the attempt is not successful. Arrow 304 indicates AIR 133 attempting to connect to the VRSP 141. In this case the connection is successful and the VRSP 141 completes the first row in its allocation table 146.

Arrow 304 indicates AIR 134 attempting to connect to VRSP 140. The attempt is not successful and arrow 305 indicates AIR 134 successfully connecting to VRSP 141 after which the VRSP completes the second row in its allocation table 146.

The AIRs are thus organized into two groups 321 and 322.

Figure 4:
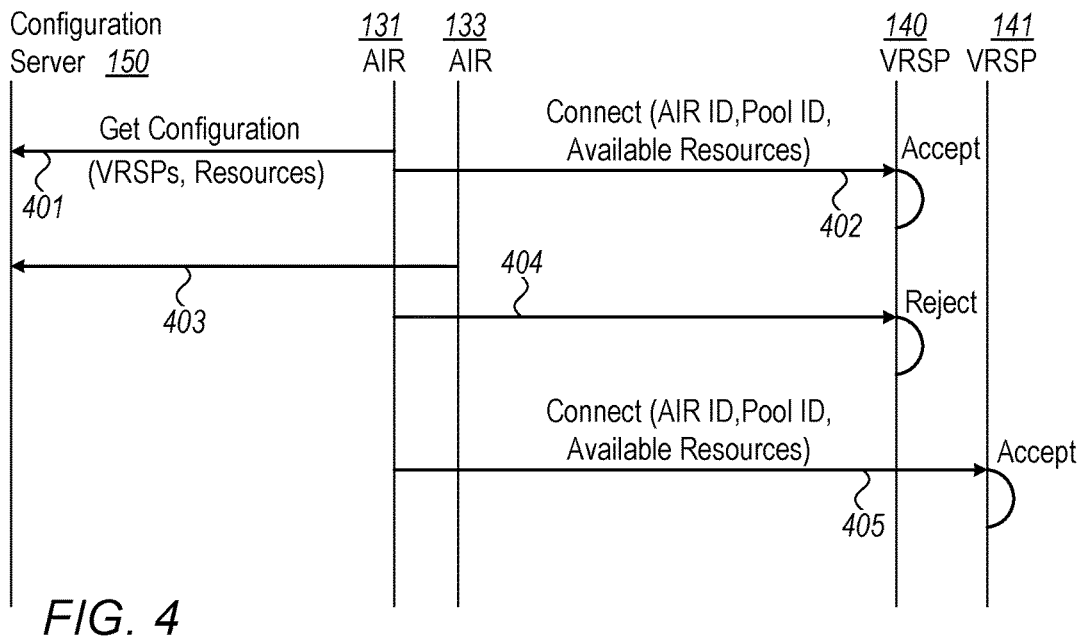
FIG. 4 shows a possible messaging flow between recording devices and resource allocators that may take place in the system shown in FIG. 3 according to some embodiments of the invention.

FIG. 4 shows a possible messaging flow between AIRs and VRSPs that may take place in the system shown in FIG. 3 according to some embodiments of the invention. The messaging may be done according to session initiation protocol. Arrow 401 shows AIR 131 sending a request to the configuration server 150 for its mapping. Arrow 402 shows AIR 131, after receiving its mapping from the configuration server, sending a request to connect with VRSP 140 which accepts the request. Arrow 403 shows AIR 133 sending a request to the configuration server 150 for its mapping. Arrow 404 shows AIR 133 sending a request to connect with VRSP 140 which rejects the request. Arrow 405 shows AIR 133 sending a request to connect with VRSP 141 which accepts the request.

Two methods of mapping resources to resource allocators are described with reference to FIGS. 2, 3 and 4. These methods are not mutually exclusive and other methods according to some embodiments of the invention may use one or more operations from both methods.

According to some embodiments of the invention, an AIR can be connected to more than one VRSP.

Resource Allocation

After recording devices and their resources have been mapped to resource allocators such as VRSPs, systems or methods according to embodiments of the invention may allocate resources at the start of each recording session. Each resource allocator may be configured to allocate calls to respective recording resources and to communicate the allocation to the gateway to permit direct communication between the recording resources and the gateway. This may be performed for example on initiation of a call. Thus the allocation of resources may be dynamic rather than static, e.g. pre-allocated. Redundancy may be provided by using a resource at each of two resource allocators so that if one fails there is no loss of recorded information since it has been captured by the other. However, within the a resource allocator, resources may be allocated "on the fly" or dynamically, for example at the start of a recording session, and this may be done independently of any other resource allocator. Thus, for example, it is not necessary for resources to be paired in advance for the purpose of providing redundancy and there is no need for synchronization between two resource allocators. This may lead to several advantages. For example, loads on individual resources may be balanced more evenly since resources are not tied to each other and may simply be called on according to availability or other scheduling parameters.

Figure 5:
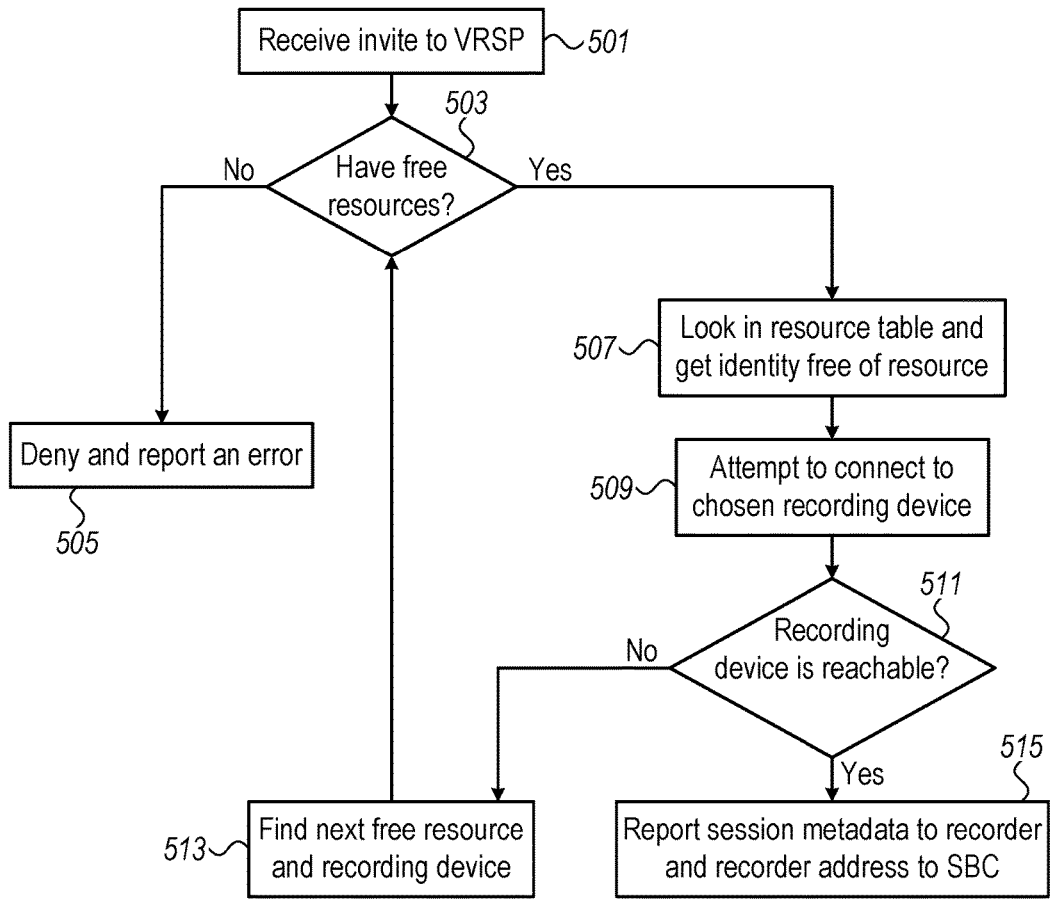
FIG. 5 is a flow chart of operations performed in a resource allocator according to some embodiments of the invention.

FIG. 5 shows a flow chart of operations that may be performed by an individual VRSP in the allocation of resources according to one embodiment.

Figure 6:
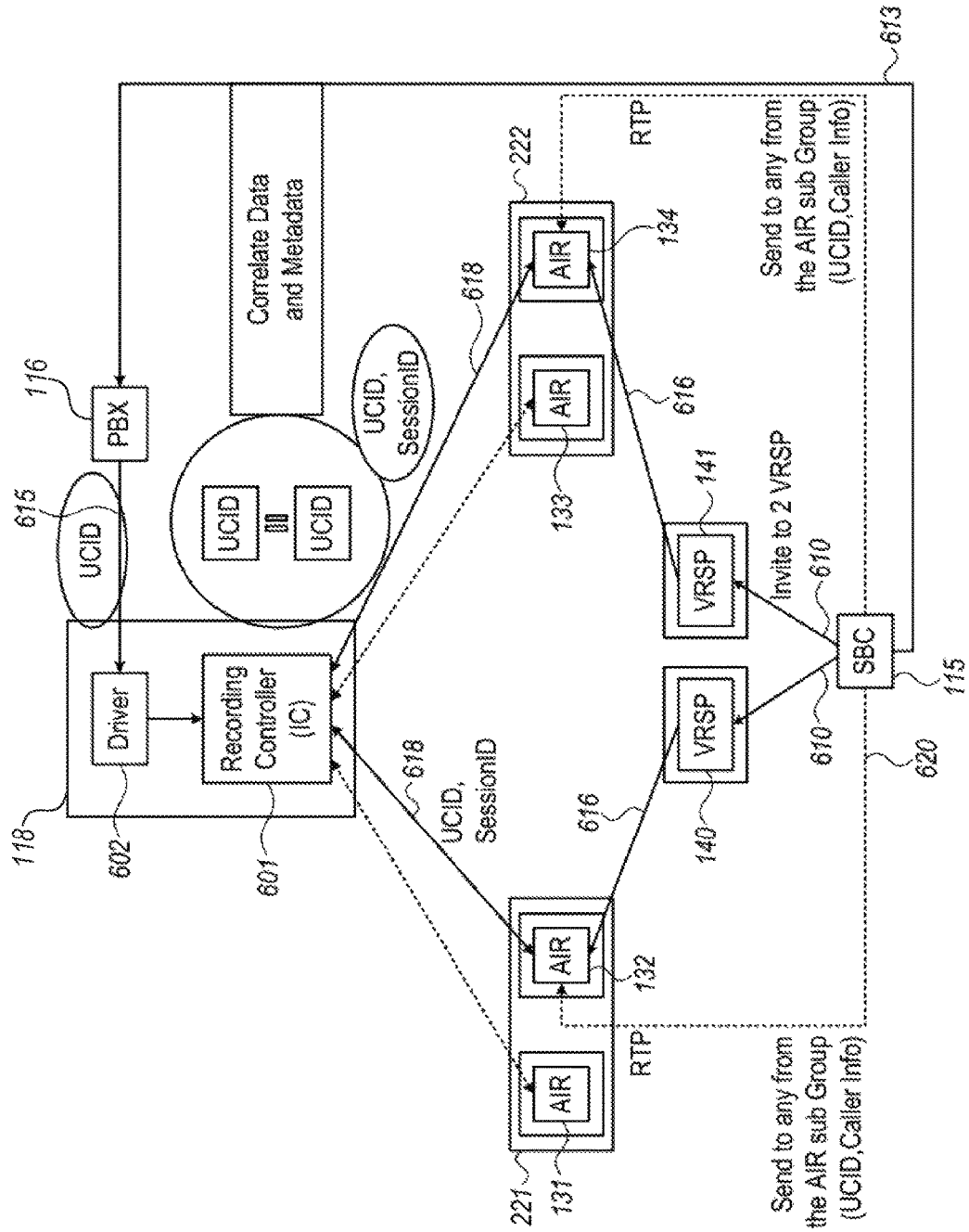
FIG. 6 illustrates a messaging flow establishing dual recording according to some embodiments of the invention.

At operation 501, a VRSP receives a request, for example from session border controller 115, for the initiation or commencement of recording. This may be in the form of a SIP invite message. The request may include a unique call ID allocated or attached to the call, for example by the SBC 115. The session border controller may send requests to two different VRSPs in parallel in order to initiate or establish dual recording, as shown in FIG. 6.

In response to this request, at operation 503, the VRSP determines whether it has any free resources, for example whether any of the AIRs mapped to the VRSP has a free resource. This may be done for example by the VRSP consulting its allocation table. The allocation table may indicate the status, busy or not, of all the resources for a particular user at the AIRs connected or mapped to that VRSP.

If no resource is available, at operation 505 the request may be denied. Depending on how many VRSPs are in the system the SBC 115 may then request a resource from another VRSP.

If a resource is available, then at operation 507 the VRSP may consult its allocation table and obtain the identity of one or more resources indicated as not busy. Then, among those resources that are not busy the VRSP may query the availability of one or more of the recording devices providing those resources to identify an available recording device. For example, at operation 509 the VRSP may attempt to connect to the recording device at which a first chosen resource, whose identity was obtained at operation 507, is situated. At operation 511 an examination is made as to whether the attempt was successful, e.g. the recording device was reachable or available. If the recording device is not reachable or available, then at operation 513 the VRSP may look for another free resource at a different recording device. Operations 503 to 511 may be repeated. In second and subsequent iterations of operation 503 the query is whether there is a free resource at a recording device that has not been already found to be unavailable. After an available or reachable recording device has been identified, for example, at operation 511, after the VRSP has successfully connected to a recording device at operation 509, the flow may continue to operation 515. Here, according to some embodiments of the invention, the resource allocator or VRSP has received from the recording device or AIR session metadata such as an address and/or port for a recording resource, and transmits the address to the call receiving node or SBC 115 to enable direct communication between the recording device and the call receiving node. In the specific example shown in FIG. 5 session metadata transmitted to the VRSP from the SBC is reported or sent to the AIR and the recording device address is reported or sent to the SBC so that the location of the recording is known to the SBC. Session metadata may include items such as but not limited to any one or more of UCID, call date and time, and identities of participants.

After operation 515, the SBC may communicate with the AIR to create or establish an RTP channel. The communication may be direct, bypassing the VRSP, as indicated by the dotted line 160 in FIG. 1.

The VRSP may perform the following operations in maintaining allocation data:

1. A VRSP receives a SIP request from SBC containing unique caller ID "UCID", for allocation of next available channel as at operation 501.

2. At operation 507 if a free resource is obtained the allocation table is updated with the UCID as indicated in Table 4 (if Allocation Data.Busy=false then Allocation Data.UCID=12TREZ554).
3. At operation 509 the VRSP checks if chosen AIR is available, if not--→go to the next available AIR at operation 513.
4. On successful connection to a recording device, at operation 515 the VRSP:
   updates the allocated channel as 'Busy' (Allocation Data.Busy=true).
   extracts IP & Port from allocation data (Allocation Data.GetIP( ), Allocation Data.GetPort( )) and responds to SBC with allocation data for streaming RTP.
   updates allocated AIR with new UCID attached or associated to its allocation data (UpdateAIRwithNewAllocation(AIR ID, Allocation Data, UCID)).

After receiving allocation data for streaming, the SBC 115 starts streaming or providing RTP to the allocated channel (IP and Port) in AIR.

On a session close request from SBC 115, the VRSP frees allocation data and sets the resource as 'Available' again (Allocation Data.Busy=false)

TABLE 4

| VRSP Allocation Table with UCID Added | |
| --- | --- |
| AIR ID | Integer |
| Designation IP address | String |
| Destination Port | Integer |
| Busy | BOOL |
| UCID | String |

Dual Recording

The provision of redundancy by dual recording will now be explained with reference to FIG. 6 which shows some of the components of the system of FIGS. 1-3 according to some embodiments indicated with like reference numerals. FIG. 6 shows in addition that the interactions center 118 includes a recording controller 601 and associated driver 602. The recording controller may communicate with all of the recording devices, e.g. AIRs, individually. According to some embodiments of the invention, the gateway, or in this example the SBC 115, is configured to forward or direct the call content, with the unique call ID, to the recording system 111 to initiate or establish redundant recording of call content. This forwarding may be passive in the sense that neither the caller nor the agent needs to take any action for recording to take place. The SBC may receive, for a call, content and metadata and may remove some or all of the metadata and transmit the remainder with the UCID to the recording system for recording the content.

For the purpose of dual recording the SBC 115 may send invite requests to two VRSPs 140 and 141 as indicated by arrows 610. A system according to some embodiments of the invention may include more than two VRSPs. Next, the SBC may send the UCID and other information for example caller information to the PBX 116, as indicated by arrow 613 and the PBX 116 sends this information to the recording controller 601 at the interactions center 118 as indicated by arrow 615. The VRSPs may then attempt to connect to respective ones of the AIRs, in the illustration AIRs 132 and 134, as indicated by arrows 616. On successful connection the AIRs may then report or send the UCID and a session ID to the recording controller 601 as indicated by arrows 618. The recording controller 601 will receive identical UCIDs from the respective AIRs which it can then correlate. Once resources have been allocated, the AIRs may receive RTP information directly from the SBC 115 bypassing the VRSPs as indicated by dotted lines 620. Thus the system may be configured for direct transmission of call content from the gateway, in this example the SBC 115, to respective recording resources, for example at respective recording devices, following allocation of recording resources to a call.

Content may be transmitted, e.g. streamed, from the SBC 115 to recording devices as packets. Once a recording device receives a first packet from the SBC 115 it may transmit an event notification to the recording controller 601 with recording metadata including UCID. After receipt of the event notification the recording controller may be able to understand from the packet information that all following packets are related to the same call.

At this point, e.g. on receiving an event notification from a recording device, the recording controller 601 may be able to correlate interaction metadata with recording metadata. If the recording controller 601 still does not have CTI information for example due to delay, it may store the recording metadata locally and perform correlation on later receiving interaction metadata.

The recording metadata may be attached to the interaction metadata to form a set of metadata relating to the call. The recording metadata may enable the retrieval of content which may be stored at a recording device and/or the interactions database 119, for example by including a file path. Since an interaction may include more than one recording one set of interaction metadata may have more than one set of recording metadata attached to it.

The recording controller may use the correlated recording metadata and call metadata to create an integrated set of metadata for each call. This may be made available to real time applications for example at RT server 170, for example by being or notified or published to RT server 170.

The recording controller 601 may receive duplicate recording metadata for respective recordings of the same content from different recording devices, both with the same UCID. The recording controller may understand from the UCID that the two recordings relate to the same call. At the same time, each reported set of recording metadata may have some parameters that are different from each other such as, for example, the identity of the recorder at which the recording was made, whereby the recorder may identify that it has two different recordings of the same content. For example, both recordings may have the same UCID, the same Start/Stop time, but different Recorder ID and recording file path.

It may use the UCID to identify the duplication and use only one set of recording metadata for correlation with call metadata.

Figure 7:
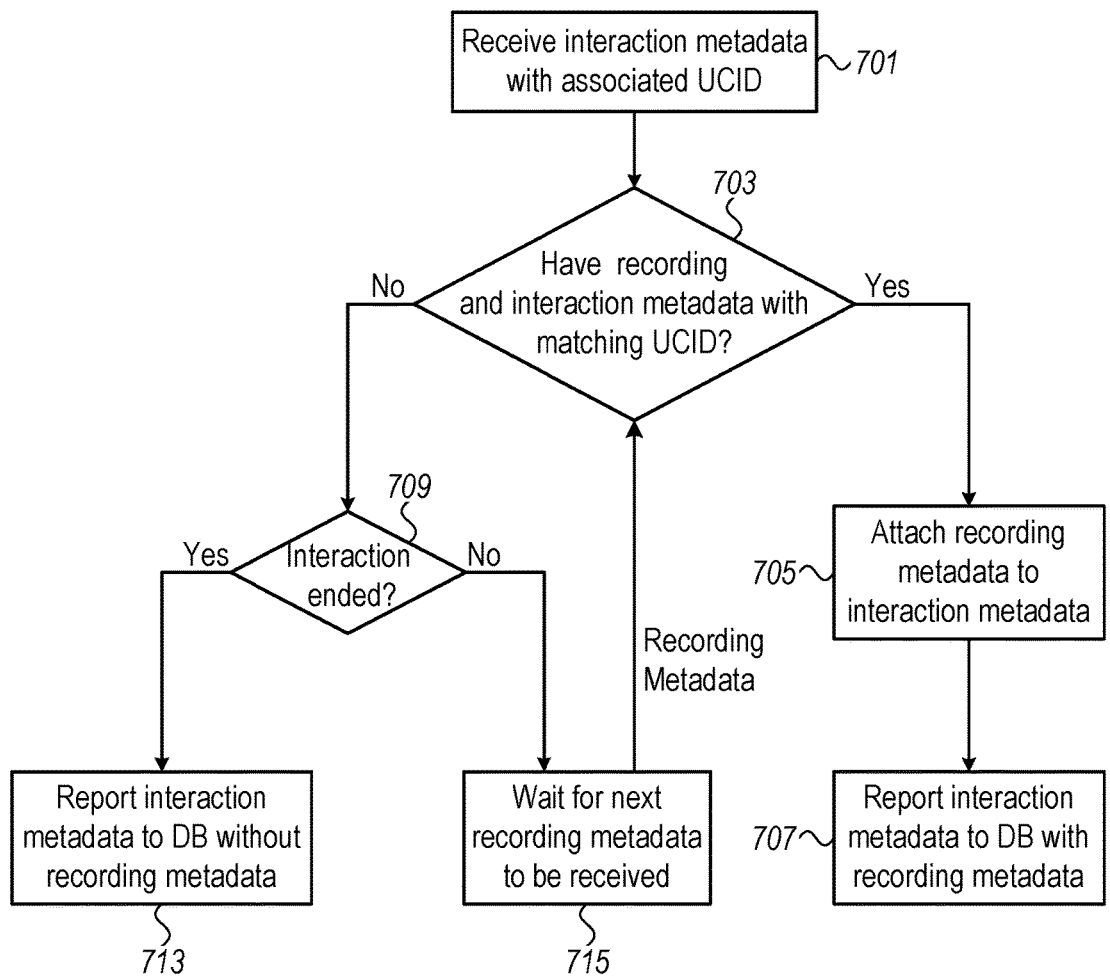
FIG. 7 is a flow chart illustrating the correlation of recordings and associated metadata according to some embodiments of the invention.

FIG. 7 shows a work flow that may take place in a recording controller, for example at the interactions center 118, to match or correlate recording metadata such as may be received from AIRs 131-134 to interaction metadata, for example relating to the caller or the caller's business, that may have been received or created at the interactions center 118. Such interaction metadata may include computer telephony integration "CTI" metadata.

Tables 5 and 6 show respectively examples of CTI metadata "CTI_DATA" and Recording metadata "CTI_DATA" that may be received at the interactions center 118. The CTI metadata may be supplied to the interactions center 118 by the CTI server 117 and the recording metadata may be supplied to the interaction center 118 by AIRs 131-134.

TABLE 5

| CTI_DATA | |
|---|---|
| InteractionID | Long |
| Participants[ ] | Participant |
| UCID (MediaID) | GUID |
| RecorderData[ ] | Recording_DATA |
| Reason (Start/End) | Integer |
| CustomerPhoneNumber | String |

TABLE 6

| Recording_DATA | |
|---|---|
| RecorderID | Integer |
| SessionID | Long |
| UCID | GUID |
| CustomerPhoneNumber | String |

An example of matching metadata, in this case recording metadata to CTI metadata, can be represented in pseudo code as follows (in which "recorder" denotes a recording device):

1. CTI Event is received (CTI_DATA.InteractionID=1, CTI_DATA.UCID=11, StartCall CTI_DATA.Reason=1);
2. Recording metadata is received from the recorder (Recording_DATA.RecorderID=1, Recording_DATA.UCID=11, Recording_DATA.SessionID=1);
3. Check if CTI metadata and Recording metadata match each other (Recording_DATA.UCID==CTI_DATA.UCID). If Yes, add recording to Interaction CTI_DATA.RecorderData[0]=Recording_DATA;

1 and 2 can occur in the opposite order e.g. recording metadata may be received in advance of CTI metadata.

The work flow of FIG. 7 may begin with operation 701 in which interaction metadata, may be received at the recording controller 601, for example from the SBC, with a particular unique call or interaction ID. This may be initiated by an event such as "start interaction" or "end interaction". Then at operation 703 the recording controller may check whether it has recording metadata with a matching call ID. If dual recording is operating successfully, for example as shown in FIG. 6, the recording controller may have two sets of recording metadata with the same call ID.

If the recording controller 601 does have one or more sets of recording metadata with a matching call ID the flow will continue to operation 705 where at least one set of recording metadata is attached to the interaction metadata. The result may be an integrated set of metadata for each call comprising recording metadata and call metadata. Then at operation 707 the complete interaction data including recording metadata and interaction metadata are stored together at the database 119.

If the recording controller has no recording metadata with a matching call ID, the flow continues to a decision at 709 as to whether the interaction, or call, to which the interaction metadata relates, has ended. If it has, then at operation 711 the interaction metadata is reported or sent to the database without any recording metadata. If the call, or interaction, has not ended it is possible that recording metadata will be received and therefore the recording controller may wait, as indicated at operation 715, for the next recording metadata to be reported from the AIRs and determine again at operation 703 whether it has interaction and recording metadata with matching IDs. Some embodiments of the invention are intended to reduce the possibility that no recording is created. If metadata is missed, for example due to a failure of the PBX or a malfunction at the interactions center, an allocation mechanism according to some embodiments of the invention may allow the addition of at least some such missed information and the insertion of call metadata to an interactions database, for example as a result of a recording device keeping metadata received from the SBC 115.

According to some embodiments of the invention content being recorded may be made available in real time at the same time as dual or redundant recording is taking place. For example, the recording controller 601 may expose or make available to RT applications at the RT server 170 a single call including content and metadata. The dual recording may thus be invisible to the RT applications.

Figure 8:
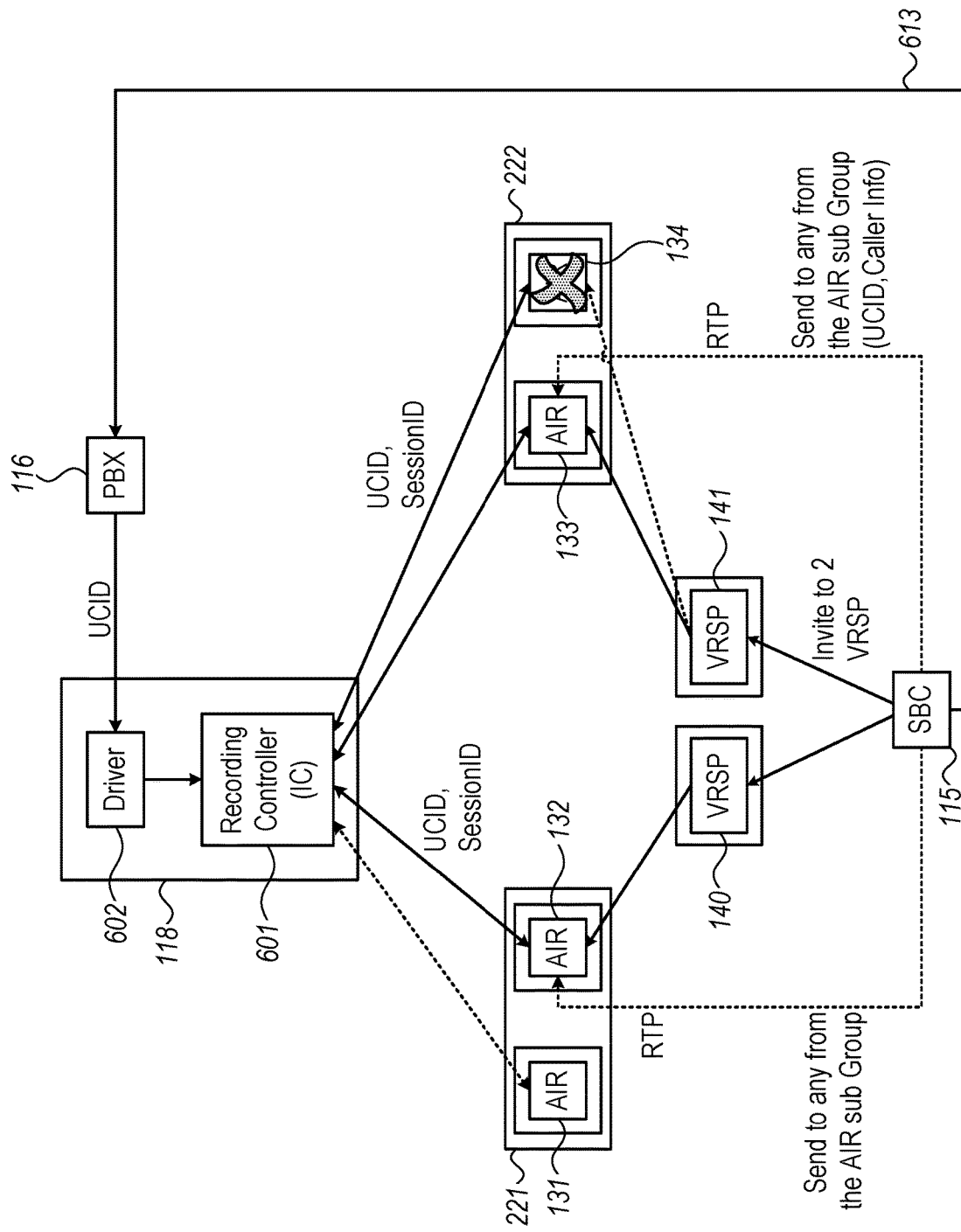
FIGS. 8-10 illustrate how recording may be ensured in the event of possible failure of components of a system according to some embodiments of the invention.
Figure 9:
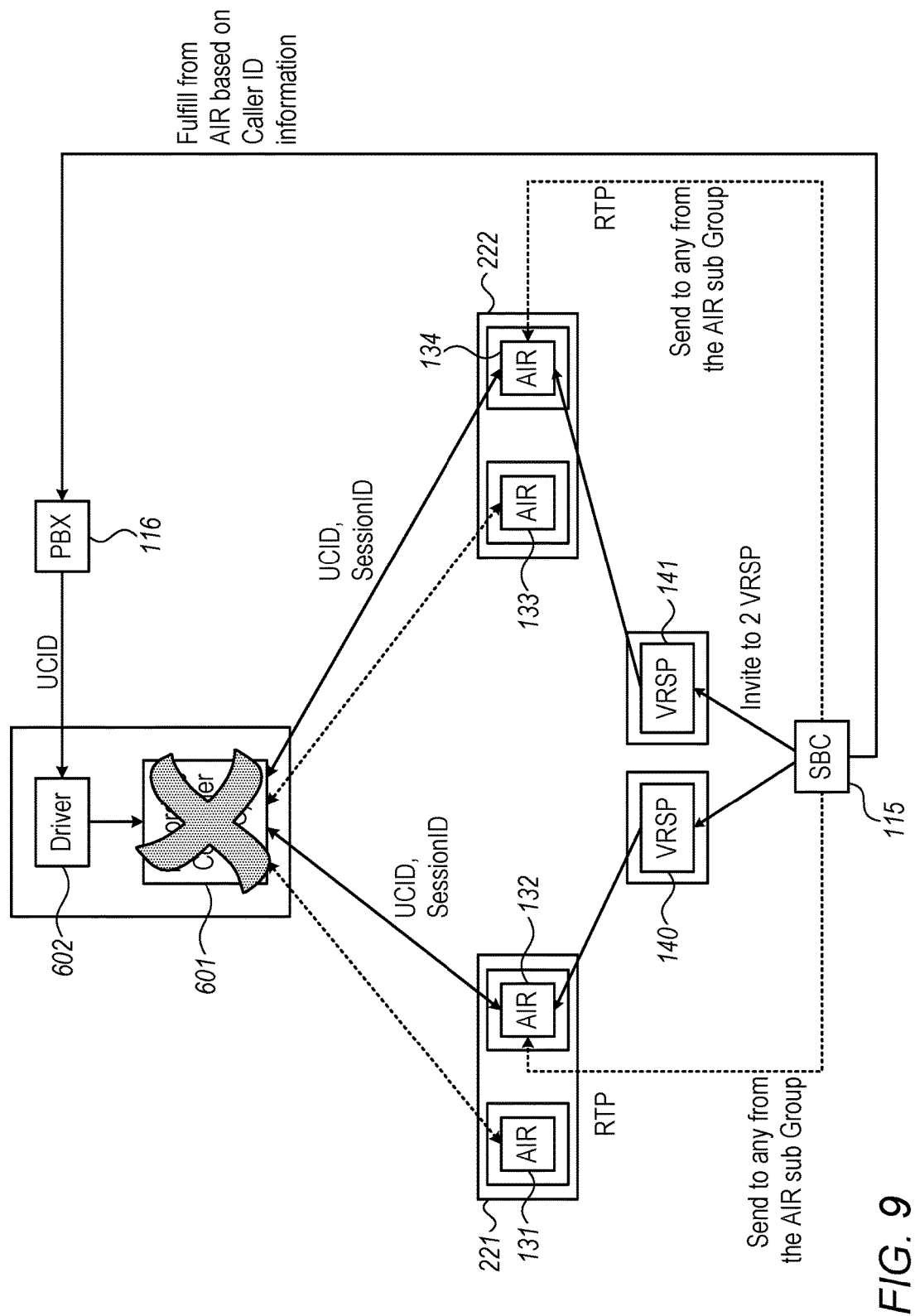
Figure 10:
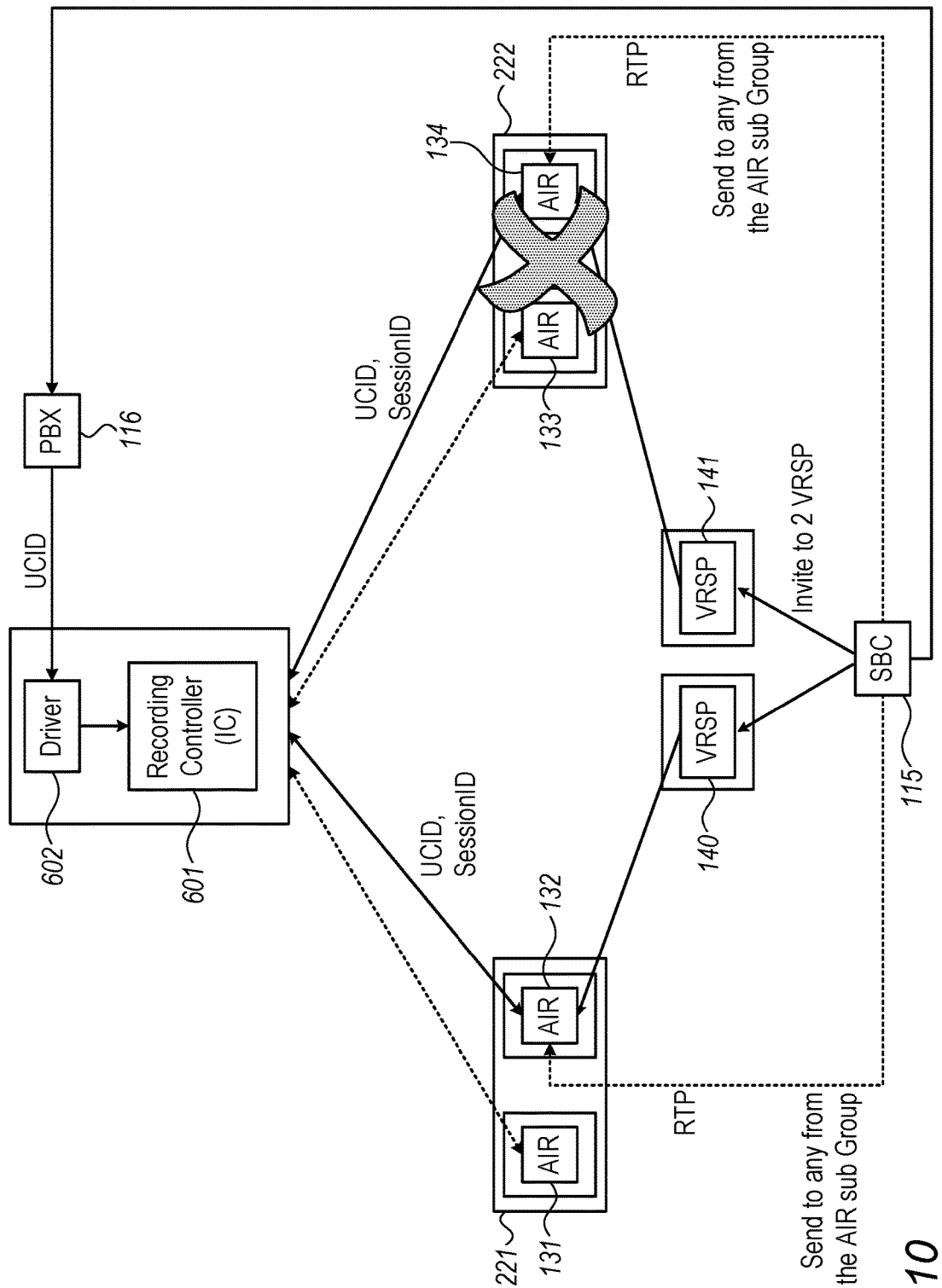

FIGS. 8-10 show messaging flows similar to FIG. 6 to illustrate how call recording is ensured in the event of possible failure of components of a system according to some embodiments of the invention.

FIG. 8 shows the possibility of a VRSP attempting to connect with AIR 134, for example as part of the operation flow shown in FIG. 5. If AIR 134 is not reachable, for example at operation 509, then another recording device such as AIR 133 is found and a connection is made to that AIR. Therefore if one AIR goes offline for example, dual recording is still possible. This is due to the dynamic allocation of AIRs at the initiation of a session. In a system in which recording devices are prearranged in pairs, dual recording is not possible if one of them is not available.

FIG. 9 shows the possibility of the recording controller 601 being disconnected from the AIRs or otherwise failing in some way. On reconnection, it can query the AIRs for unreported call recording metadata and correlate this with interaction metadata based on the recording data such as customer phone number or call ID. This is possible for example if the recording controller has received the call ID, for example from the SBC 115, which it may keep to allow correlation or synchronization of interaction metadata and recording metadata at a later time. Thus for example a set of metadata to be stored at database 119 may comprise recording metadata received by the recording controller from a recording device and interaction metadata relating to the call, at least some of which is received by the recording controller from the recording device or the PBX, all of which is associated with the unique call ID. The recording controller can then use the UCID to compile the set of metadata relating to the call. Interaction metadata received from the recording device or the PBX may include various items including but not limited to telephone numbers, identities of parties to the interaction, start and end times, duration, date and more.

FIG. 10 shows the possibility of a complete group of AIRs 222 being unavailable, possibly due to a failure of the VRSP to which they are mapped. In this scenario there is another available recording via the other VRSP.

Reference is made to FIG. 11, showing high level block diagram of an exemplary computing device according to embodiments of the present invention. Computing device 1100 may include a controller 1105 that may be, for example, a central processing unit processor (CPU), a chip or any suitable computing or computational device, an operating system 1115, a memory 1120, a storage 1130, input devices 1135 and output devices 1140. Interactions center 118 may comprise a computing device such as device 1100 and database 119 may comprise storage similar to storage 1130.

Operating system 1115 may be or may include any code segment designed and/or configured to perform tasks involving coordination, scheduling, arbitration, supervising, controlling or otherwise managing operation of computing device 1100, for example, scheduling execution of programs. Operating system 1115 may be a commercial operating system. Memory 1120 may be or may include, for example, a Random Access Memory (RAM), a read only memory (ROM), a Dynamic RAM (DRAM), a Synchronous DRAM (SD-RAM), a double data rate (DDR) memory chip, a Flash memory, a volatile memory, a non-volatile memory, a cache memory, a buffer, a short term memory unit, a long term memory unit, or other suitable memory units or storage units. Memory 1120 may be or may include a plurality of, possibly different memory units.

Executable code 1125 may be any executable code, e.g., an application, a program, a process, task or script. Executable code 1125 may be executed by controller 1105 possibly under control of operating system 1115. For example, executable code 1125 may be an application which may be used by a resource allocator such as VRSP 140 or 141 to allocate a recording resource in response to a request from a gateway or other communication network node. Where applicable, executable code 1125 may carry out operations described herein in real time. Computing device 1100 and executable code 1125 may be configured to update, process and/or act upon information at the same rate the information, or a relevant event, are received. In some embodiments, more than one computing device 1100 may be used. For example, a plurality of computing devices that include components similar to those included in computing device 1100 may be connected to a network and used as a system. For example, the allocation of recording resources may be performed in real time by executable code 1125 when executed on one or more computing devices such computing device 1100.

Storage 1130 may be or may include, for example, a hard disk drive, a floppy disk drive, a Compact Disk (CD) drive, a CD-Recordable (CD-R) drive, a universal serial bus (USB) device or other suitable removable and/or fixed storage unit. Content may be stored in storage 1130 and may be loaded from storage 1130 into memory 1120 where it may be processed by controller 1105. In some embodiments, some of the components shown in FIG. 11 may be omitted. For example, memory 1120 may be a non-volatile memory having the storage capacity of storage 1130. Accordingly, although shown as a separate component, storage 1130 may be embedded or included in memory 1120.

Input devices 1135 may be or may include a mouse, a keyboard, a touch screen or pad or any suitable input device. It will be recognized that any suitable number of input devices may be operatively connected to computing device 1100 as shown by block 1135. Output devices 1140 may include one or more displays, speakers and/or any other suitable output devices. It will be recognized that any suitable number of output devices may be operatively connected to computing device 1100 as shown by block 1140. Any applicable input/output (I/O) devices may be connected to computing device 1100 as shown by blocks 1135 and 1140. For example, a wired or wireless network interface card (NIC), a modem, printer or facsimile machine, a universal serial bus (USB) device or external hard drive may be included in input devices 1135 and/or output devices 1240.

Embodiments of the invention may include an article such as a computer or processor non-transitory readable medium, or a computer or processor non-transitory storage medium, such as for example a memory, a disk drive, or a USB flash memory, encoding, including or storing instructions, e.g., computer-executable instructions, which, when executed by a processor or controller, carry out methods disclosed herein. For example, a storage medium such as memory 1120, computer-executable instructions such as executable code 1125 and a controller such as controller 1105.

Some embodiments may be provided in a computer program product that may include a non-transitory machine-readable medium, stored thereon instructions, which may be used to program a computer, or other programmable devices, to perform methods as disclosed herein. Embodiments of the invention may include an article such as a computer or processor non-transitory readable medium, or a computer or processor non-transitory storage medium, such as for example a memory, a disk drive, or a USB flash memory, encoding, including or storing instructions, e.g., computer-executable instructions, which when executed by a processor or controller, carry out methods disclosed herein. The storage medium may include, but is not limited to, any type of disk including floppy disks, optical disks, compact disk read-only memories (CD-ROMs), rewritable compact disk (CD-RWs), and magneto-optical disks, semiconductor devices such as read-only memories (ROMs), random access memories (RAMs), such as a dynamic RAM (DRAM), erasable programmable read-only memories (EPROMs), flash memories, electrically erasable programmable read-only memories (EEPROMs), magnetic or optical cards, or any type of media suitable for storing electronic instructions, including programmable storage devices.

A system according to embodiments of the invention may include components such as, but not limited to, a plurality of central processing units (CPU) or any other suitable multi-purpose or specific processors or controllers, a plurality of input units, a plurality of output units, a plurality of memory units, and a plurality of storage units. A system may additionally include other suitable hardware components and/or software components. In some embodiments, a system may include or may be, for example, a personal computer, a desktop computer, a mobile computer, a laptop computer, a notebook computer, a terminal, a workstation, a server computer, a Personal Digital Assistant (PDA) device, a tablet computer, a network device, or any other suitable computing device. Unless explicitly stated, the method embodiments described herein are not constrained to a particular order or sequence. Additionally, some of the described method embodiments or elements thereof can occur or be performed at the same point in time.

Unless explicitly stated, the method embodiments described herein are not constrained to a particular order or sequence. Additionally, some of the described method embodiments or elements thereof can occur or be performed at the same point in time.

It will be appreciated from the foregoing that some embodiments of the invention provide one or more of the following benefits over prior art recording systems.

Some embodiments of the invention may use an innovative resource allocation mechanism, which can be either according to user's preferences, for example to achieve load balancing, or by recording device self-organization. A hybrid between these two approaches is also possible.

Recording data and metadata may be correlated according to a unique call ID, which may be allocated by the session border controller. In this connection it should be noted that the phone number from or to which a call is made may not be unique to a customer and may not be represented in the same way in CTI data and recording data. Therefore in some embodiments of the invention the UCID is particularly useful in correlating CTI information and recorded content. This correlation may be done at one point in the data flow. In the embodiments described herein that one point is in the recording controller but it could be any component which receives both the recording data and, from another component, other data relating to the call or the recording.

Some embodiments of the invention may provide a system that has no critical path whose failure may lead to loss of recording. For example, even if metadata is missed, some embodiments of the invention provide an allocation mechanism and correlation flow that allow information to be inserted into or matched with call content at the interactions database. Some embodiments of the invention do not require a failover process such as a standby mechanism that is brought into action upon failure of a system component.

Some embodiments of the invention do not require the recording devices to be equal. For example some embodiments of the invention may use recording devices with different capabilities. A user could align a system according to an embodiment of this invention to the existing capabilities of his servers and for example use a virtual machine for one AIR and physical server for another AIR.

Some embodiments of the invention permit a recording device to obtain metadata from a source and keep it to allow later metadata and data (e.g. content) synchronization even if, for example, the recording controller is down.

Some embodiments of the invention provide a system in which synchronization between resource allocators, e.g. VRSPs, is not necessary. Each VRSP may allocate a resource for recording independently of the other one. There is no need for example for the resource allocators to pair respective resources and to allocate recording resources in predetermined pairs.

Some embodiments of the invention may include computer readable media, for example in non-transitory form, which when implemented in one or more processors in one or more computing devices cause the devices to perform a method according to an embodiment of the invention.

Some embodiments of the invention may include computer readable media, for example in non-transitory form, which when implemented in one or more processors in one or more computing devices cause the devices to form a system according to an embodiment of the invention.

Unless explicitly stated, the method embodiments described herein are not constrained to a particular order or sequence. Additionally, some of the described method embodiments or elements thereof can occur or be performed at the same point in time.

While certain features of the invention have been illustrated and described herein, many modifications, substitutions, changes, and equivalents may occur to those skilled in the art. It is, therefore, to be understood that the appended claims are intended to cover all such modifications and changes as fall within the true spirit of the invention.

Various embodiments have been presented. Each of these embodiments may of course include features from other embodiments presented, and embodiments not specifically described may include various features described herein.

What is claimed is:

1. A method of allocating recording resources in a system for real time redundant recording of call content, the system comprising a plurality of recording devices each comprising a plurality of recording resources, and at least two resource allocators, each recording device being associated with one resource allocator; the method comprising operating two resource allocators independently of each other to:

receive a request from a call receiving node in the system for commencement of a recording session;

in response to the request, query the availability of one or more associated recording devices to identify an available recording device;

after identification of an available recording device, establish a recording session between the call receiving node and the available recording device, and report to the call receiving node the address of an available resource at the available recording device to enable direct communication between the recording device and the call receiving node for streaming the content;

receive recording metadata for a call being recorded from a recording device; and if the recording device is disconnected, upon reconnection with the recording device, query the recording device for unreported metadata for the call.

2. The method of claim 1 in which the call receiving node is a gateway to a contact center environment and the recording devices and the resource allocator are part of a recording system in the contact center environment.

3. The method of claim 1, comprising if a recording device is not reachable, finding a different recording device.

4. The method of claim 1, comprising:
receiving metadata relating to the call; and
integrating the call metadata and the recording metadata.

5. The method of claim 1, comprising upon reconnection with the recording device, correlating metadata for the call with metadata relating to the call.

6. The method of claim 1, comprising in the case that one of the at least two resource allocators has failed, using a recording device associated with another of the at least two resource allocators.

7. A system for redundant call recording comprising a call receiving node, a recording system comprising at least two recording devices, and a recording controller;
wherein the recording system is configured to establish independent and separate recording of call content using two of said recording devices;
the recording controller is configured to link call content with call metadata to enable retrieval of call content during recording;
the recording controller is configured to receive recording metadata for a call being recorded from a recording device; and
if the recording device is disconnected, upon reconnection with the recording device, query the recording device for unreported metadata for the call.

8. The system of claim 7 wherein the recording system comprises a pair of resource allocators and each recording device is associated with one resource allocator, the call receiving node is configured to receive respective recording resource addresses from the resource allocators, and in response to receiving the addresses, to stream call content direct to the recording devices bypassing the resource allocator.

9. The system of claim 7 wherein the recording controller is configured to:
separately receive metadata relating to the call; and
integrate the call metadata and the recording metadata.

10. The system of claim 9 in which the integration of content and metadata is performed using a unique call identity associated with the content and the metadata.

11. The system of claim 7, comprising upon reconnection with the recording device, correlating metadata for the call with metadata relating to the call.

12. The system of claim 7, comprising at least two resource allocators, each recording device being associated with one resource allocator, wherein in the case that one of the at least two resource allocators has failed, the recording system is configured to use a recording device associated with another of the at least two resource allocators.

13. The system of claim 7, wherein if a recording device is not reachable, the recording system is configured to find a different recording device.

* * * * *